Sept. 19, 1950 L. E. JONES 2,523,118
REARVIEW MIRROR
Filed Aug. 28, 1948
Fig. 1
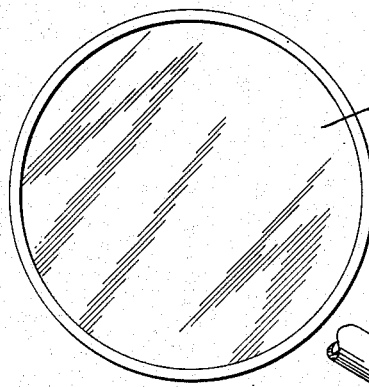
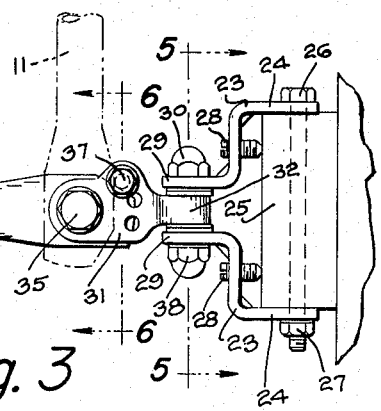
Fig. 3
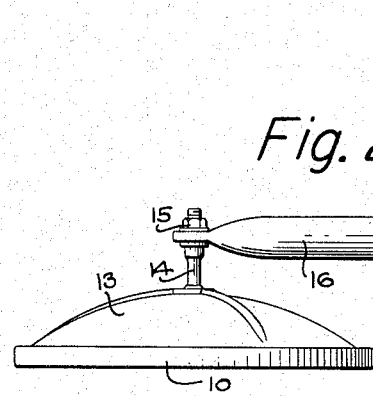
Fig. 2
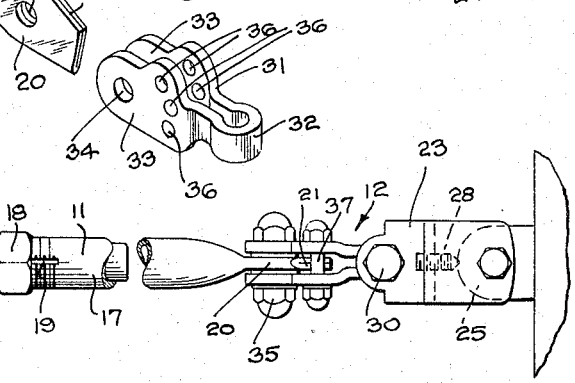
Fig. 5
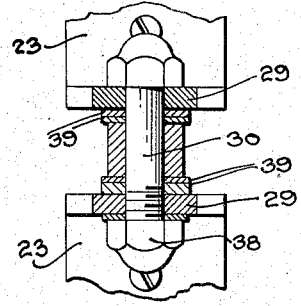
Fig. 4
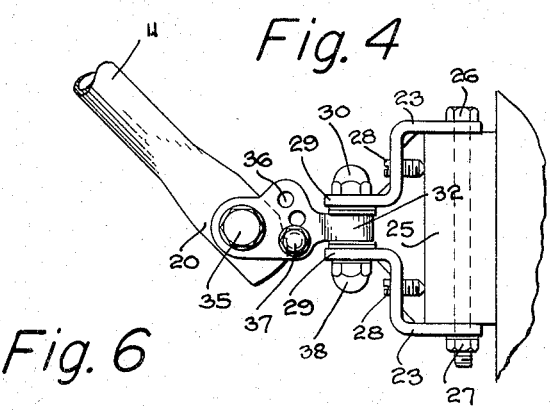
Fig. 6
*INVENTOR.*
LIVINGSTON E. JONES
BY
*ATTORNEY*

Patented Sept. 19, 1950

2,523,118

UNITED STATES PATENT OFFICE 2,523,118

REARVIEW MIRROR

Livingston E. Jones, Philadelphia, Pa.

Application August 28, 1948, Serial No. 46,681

9 Claims. (Cl. 248—278)

This invention relates to rear-view mirrors for automotive vehicles and more particularly to an improved construction of a positionally adjustable support for mounting a rear-view mirror upon the side of the driver's cab of a truck, bus or like vehicle.

Among the principal objects of the present invention is to provide a construction of side arm support for a rear-view mirror which is adapted not only to be readily mounted upon the vehicle and adjusted in position to afford the operator a clear view in the mirror of conditions existing to the rear of the vehicle, but also to be swung from its operative outwardly extending position into a vertical position closely adjoining the vehicle body so as not to constitute an obstruction against free movement of the vehicle through passages of limited width.

A further and important object of the invention is to provide a mounting for the rear-view mirror which is simple and inexpensive to manufacture, which is adapted to be readily installed upon existing constructions of vehicles, which is readily and conveniently adjustable to vary the location of the mirror to most efficiently suit the requirements of the vehicle operator and which is adapted to be easily and quickly swung into inoperative position when so required without altering the setting of the mounting for a predetermined operative location of the mirror.

Other objects and advantages of the present invention will appear more fully hereinafter, it being understood that the said invention consists substantially in the combination, construction, location and relative arrangement of parts, all as described more fully hereinafter, as shown in the accompanying drawings and as finally pointed out in the appended claims.

In the accompanying drawings, which are illustrative of a preferred embodiment of the invention, Figure 1 is a side elevational view of a rear view mirror mounted upon the side of a vehicle by means of the mounting of the present invention;

Figure 2 is a top plan view of the assembly shown in Figure 1;

Figure 3 is an exploded view in perspective of the mounting clevis and the inner end of the mirror-supporting arm;

Figure 4 is a view similar to Figure 1 but showing the mounting differently set to vary the operative inclination of the mirror supporting arm;

Figure 5 is a vertical sectional view as taken on the line 5—5 of Figure 1; and

Figure 6 is a vertical sectional view as taken on the line 6—6 of Figure 1.

Referring now more particularly to the drawings, it will be observed that the rear-view mirror assembly of the present invention generally comprises a rear-view mirror 10, an extensible supporting arm 11 and a mounting unit designated generally by the reference numeral 12 and by means of which the assembly is suitably secured in position to the vehicle to be equipped with the rear-view mirror. The mirror itself, which may be of any conventional form and shape, preferably includes a metallic dish-shaped backing 13 from the center of which rearwardly projects a stud 14 which is secured, as at 15, to the outer end of the extensible supporting arm 11. In accordance with conventional practice, the mounting stud 14 is so secured to the backing 13 as to provide for universal adjustment of the plane of the mirror relatively to the axis of the stud and thereby provide for any desired angular adjustment of the mirror within the limitations of the universal joint connection between its backing 13 and the stud 14.

The extensible supporting arm 11 is preferably formed of a pair of tubular members 16—17 telescopically secured together to vary the length of the arm as may be desired, the telescoped members of the arm being secured together in axially and angularly adjusted relation by means of a clamping nut 18 in threaded engagement with the outer end of the member 17 of the extensible arm. The nut 18 is internally tapered and the threaded portion of the member 17 is correspondingly externally tapered so that upon tightening the nut 18 the members 16 and 17 are securely clamped together in any desired axially adjusted relation, this clamping action being facilitated by slotting the threaded portion of the member 17, as at 19. The inner end of the member 17 of the extensible arm 11 is flattened, as at 20, and the upper edge chamfered, as at 21, for a purpose which will be apparent hereinafter, the flattened portion 20 being also provided with a through hole 22, as most clearly appears in Figure 3.

The mounting unit 12 includes a pair of bracket members 23—23 each of generally Z-shaped form, these members being adapted for disposition in vertically spaced relation, as best shown in Figures 1 and 2, so as to present the corresponding inwardly extending branches 24—24 thereof in embracing relation with respect to the outwardly projecting portion 25 of the vehicle door hinge. The bracket members 23—23 are secured to the outwardly projecting portion 25 of the door hinge by means of a bolt 26 which is substituted for the usual hinge pin and which projects through suitable openings provided in the branches 24—24 of the bracket members 23—23 in registry with the hinge pin bore. Preferably, the bolt 26 is secured in position by means of a coacting nut 27. In order to further secure the bracket members 23—23 in fixed immovable position, a pair of set screws 28—28 project through the intermediate branches of the bracket members 23—23 with their pointed ends bearing tightly against the fixed part of the hinge knuckle.

With the bracket members 23—23 securely mounted in position as just described, the outwardly extending branches are disposed in vertically spaced parallel relation and so provide a pair of supports for a vertically extending pin 30 (see Figure 5) which serves as a bearing for a generally U-shaped clevis member 31. The bight end 32 of this clevis, as shown most clearly in Figure 3, is looped to closely embrace the vertical bearing pin 30, while the freely extending side portions 33—33 of the clevis are disposed in parallel relation and are adapted to embrace therebetween the flattened portion 20 of the extensible supporting arm for the mirror. The said portions 33—33 of the clevis are respectively provided with through holes 34—34 adapted for registry with the hole 22 through the flattened portion 20 of the arm 11, the latter being secured between the side portions of the clevis by a transversely extending bolt 35 projecting through the transversely aligned holes of the assembled clevis and mirror-supporting arm.

As also appears most clearly in Figure 3, the parallel side portions 33—33 of the clevis 31 are respectively provided with registering pairs of apertures 36—36, through any selected pair of which is adapted to be projected a pin 37 for holding the mirror-supporting arm in operative outwardly extending adjusted position. It will be noted that the pairs of apertures 36—36 are equidistantly spaced from the transverse pivot pin 35 and that the chamfered edge portion 21 of the mirror-supporting arm extends radially beyond said pivot pin 35 so as to substantially intersect the arcuate line of the spaced apertures 36, the general arrangement being such that the chamfered edge 21 is adapted to engage the transverse pin 37 to limit downward movement of the arm 11 about its pivot pin 35.

Obviously by transferring the transverse pin 37 from one aligned pair of the apertures 36—36 to another pair thereof, the limit of permissible downward swing of the arm 11 about its pivot pin 35 may be varied as desired. Thus, when the pin 37 is projected through the uppermost pair of the apertures 36—36, as shown in Figure 1, the supporting arm 11 of the mirror may be swung downwardly about its pivot pin 35 into a substantially horizontal extending position, while when the pin 37 is projected through the lowermost pair of the aligned apertures 36—36, as shown in Figure 4, the mirror-supporting arm 11 is capable of being swung downwardly through an arc of less degree than in the case of that described for Figure 1. The positionally adjustable pin 37 thereby provides a simple and effective means for determining the limit of downward movement of the mirror-supporting arm about its pivot 35 and insures return of the mirror to any previously adjusted position thereof whenever the arm is shifted from its vertically raised position, as shown in dotted lines in Figure 1, into its outwardly extended operative position.

It will be understood, of course, that when it is desired to raise the mirror out of its operative position into one closely adjoining the body of the vehicle so that the arm does not constitute an obstruction to free movement of the vehicle through a passage of limited width, it is merely necessary to swing the arm upwardly about its pivot 35 and into its dotted line position shown in Figure 1.

The clevis 31 is, of course, free to be swung horizontally about its vertical pivot pin 30 so as to vary the position of the rear-view mirror 10 fore and aft as may be desired, the clevis being preferably suitably clamped between the embracing branches 29—29 of the bracket members by tightening the nut 38 upon the threaded end of the pivot pin 30. Preferably, a pair of washers 39—39 are interposed between each bracket element 29 and the proximate edge of the clevis, so that upon properly tightening the nut 38 upon its pivot bolt 30 the clevis 31 is clampingly held between its embracing bracket elements for frictional retention thereof in any angularly adjusted position with respect to the vertical pivot pin 30.

It will be understood, of course, that the present invention is susceptible of various changes and modifications which may be made from time to time without departing from the real spirit or general principles thereof, and it is accordingly intended to claim the same broadly, as well as specifically, as indicated in the appended claims.

What is claimed as new and useful is:

1. In a rear-view mirror assembly for automotive vehicles, in combination, a rear-view mirror, a supporting arm therefor, and an adjustable mounting for said mirror-supporting arm, said mounting including a relatively fixed bracket having a vertically extending pivot pin and a U-shaped clevis member angularly adjustable about said pivot pin, said clevis member including a pair of freely extending parallel side plates adapted to embrace therebetween the inner end of said mirror-supporting arm and a horizontally extending pivot pin about which said mirror-supporting arm is swingable, and a pin positionally adjustable on said clevis and engageable by the inner end of said arm for varying the limit of downward swing of said mirror-supporting arm about said horizontal pivot.

2. A rear-view mirror assembly for automotive vehicles and the like comprising a rear-view mirror supporting arm, a pivotal supporting member for said arm having a pair of freely extending parallel side plates adapted to embrace therebetween the inner end of said mirror-supporting arm, a pivot pin extending through said side plates and the embraced end of said mirror-supporting arm, and a detent pin projecting through said side plates in spaced parallel relation to said pivot pin and in intersecting relation to said pivoted arm for limiting downward swinging movement of the latter about said pivot pin.

3. A rear-view mirror assembly of the character described comprising a supporting arm for a rear-view mirror, a fixed support for said arm including a U-shaped member having a pair of freely extending parallel side plates, a pivot pin projecting through said plates and the inner end of the arm embraced thereby whereby said arm is pivoted for swinging movement in a vertical plane, a series of arcuately spaced pairs of registering apertures in said plates disposed with the axis of each pair paralleling said pivot pin and spaced equidistantly therefrom, and a detent pin adapted for selective projection through any one pair of said registering apertures for engagement by said arm to limit its downward swinging movement about said pivot pin, while permitting free movement of said arm upwardly about said pivot pin.

4. A rear-view mirror assembly of the character described comprising an extensible arm fitted at its outer end with a rear-view mirror, a mounting for said arm pivoted for movement about a vertical axis and having a pivot for supporting said arm for swinging movement in a substantially vertical plane, and detent means carried by said mounting in intersecting relation to the vertical plane of swinging movement of said arm to limit said movement in only one direction.

5. A rear-view mirror assembly of the character described comprising an extensible arm fitted at its outer end with a rear-view mirror, a mounting for said arm pivoted for movement about a vertical axis and having a pivot for supporting said arm for swinging movement in a substantially vertical plane, and detent means carried by said mounting in intersecting relation to the vertical plane of swinging movement of said arm to limit said movement in only one direction, said last-mentioned means being positionally adjustable on said mounting to vary the permissible swing of said arm in the said one direction.

6. A rear-view mirror assembly of the character described comprising an elongated supporting arm for a rear-view mirror, a bracket upon which said arm is pivotally mounted for swinging movement in a substantially vertical plane, said arm having a part extending rearwardly of its pivotal mounting, and a detent carried by said bracket in spaced relation to the pivotal mounting for said arm for engagement by the rearwardly extending part of said arm to limit swinging movement of the latter in one direction.

7. A rear-view mirror assembly of the character described comprising an elongated supporting arm for a rear-view mirror, a bracket having a horizontally disposed pivot pin about which said arm is swingable in a substantally vertical plane, said bracket having a series of transverse apertures radially spaced substantially equidistantly from the axis of said pivot pin, and a detent pin adapted for removable insertion in any one of said apertures to constitute a stop for limiting swinging movement of said arm in one direction about said pivot pin.

8. A rear-view mirror assembly of the character described comprising an elongated supporting arm for a rear-view mirror, a U-shaped bracket having a pair of substantially parallel laterally spaced side plates adapted to embrace one end of said supporting arm, a pivot pin projecting through said plates and the mirror-supporting arm embraced thereby, said bracket having a series of registering pairs of openings respectively formed in the side plates thereof, the axes of said registering pairs of openings being parallel to each other and to the axis of said pivot pin, and a detent pin adapted to be projected through any one pair of said openings to provide a positionally adjustable stop engageable by said arm to limit its swinging movement about said pivot pin in one direction.

9. A rear-view mirror assembly of the character described comprising an elongated supporting arm for a rear-view mirror, a U-shaped bracket having a pair of substantially parallel laterally spaced side plates adapted to embrace one end of said supporting arm, a pivot pin projecting through said plates and the mirror-supporting arm embraced thereby, said bracket having a series of registering pairs of openings respectively formed in the side plates thereof, the axes of said registering pairs of openings being parallel to each other and to the axis of said pivot pin, and a detent pin adapted to be projected through any one pair of said openings to provide a positionally adjustable stop engageable by said arm to limit its swinging movement about said pivot pin in one direction, and pivot means about which said bracket is laterally swingable.

LIVINGSTON E. JONES.

REFERENCES CITED

The following references are of record in the file of this patent:

UNITED STATES PATENTS

| Number | Name | Date |
| --- | --- | --- |
| 2,113,251 | Dover | Apr. 5, 1938 |
| 2,424,222 | Brown et al. | July 22, 1947 |
| 2,430,112 | Hamre | Nov. 4, 1947 |